Patented Nov. 14, 1933

1,935,418

UNITED STATES PATENT OFFICE 1,935,418

DENTAL FILLER

Werner Salzmann and Rudolf Funke, Dusseldorf, Germany

No Drawing. Application March 31, 1931, Serial No. 526,776, and in Germany July 2, 1930

1 Claim. (Cl. 106—6)

This invention has reference to tooth filling material and it refers particularly to means for increasing the resistability and hardness of the tooth filling and for preventing shrinkage and retaining the filling in the dental cavities, so that they will not drop out by prolonged usage. Broadly considered the invention refers to the incorporation of hardening means with the fillings, so-called dental cements or binding agents which are used either by themselves as filling means for the dental cavity or are employed for securing in position the so-called amalgams and dental alloys. With the hardening means as suggested by the previous art, and which comprised substances such as colloidal silicic acid, iron alloys and the like, it was not possible to obtain the desired high degree of hardness and to prevent the chemical action of the saliva and the decomposition products of food upon the fillings and upon the hardening means, and the color of the fillings, and consequently of the tooth to be treated was also undesirably affected, and these substances and the fillings prepared therewith were moreover subject to attrition and to the shearing action of the co-operating counter-teeth in the gums. Now in accordance with this invention hardening means are employed which may be used in connection with the usual well-known zinc-phosphatic also phosphate and silicate cements for dental purposes without producing any chemical action thereon and without being influenced by the saliva or by decomposition products and which are not subject to shrinkage and may even be used in combination with gold fillings and the so-called porcelain fillings and will cause the dental cements to adhere to the walls of the dental cavity and retain gold fillings and the like and prevent them from becoming lost in the chewing operation and from other reasons.

The invention is particularly distinguished by the use of substances which are not attacked by acids and alkalis and by the decomposition products of foods and by the saliva and which do not contain any metallic constituents which would be more or less open to extraction by the action of the liquids present in the mouth of the patient and by electrolization, and which moreover possess a hardness which is sufficiently high to resist the grinding action of the counter-teeth and sufficiently near the hardness of the enamel of the teeth to prevent serious abrasure and other injurious action thereon, when used in the fillings in connection with the usual dental cements. Inasmuch as the hardness of the enamel of the teeth is equal to the value 5 to 6 of the well-known Mohs scale, all such substances may be used as hardening means for dental fillings which possess a hardness which is more or less in excess of the value 6 of the Mohs scale, such as carborundum, diamond, and other carbonites. These substances are not attacked by acids and alkalis, will not decompose in the mouth of the patient and are free from soluble metal and injurious constituents, so that if used in combination with the usual phosphatic or silicate dental cements they will possess just the proper degree of hardness to prevent injury of both of the filling as well as the enamel of the teeth and they will moreover afford all the advantages of the usual undecomposable and non-injurious, but highly expensive gold filling. While these hardening agents are absolutely chemically inert at temperatures of about 40 degrees centigrade which is the temperature of the mouth, they will readily combine with the usual dental phosphate and silicate cements and with the so-called combination cement, all of which cements are known to be entirely proof against the action of the chemical agents present or formed in the mouth. The entire composition will readily set and adheres very well to the walls of the teeth, and in view of the admixture of the hardening agents referred to they will not be worn out by the chewing action and by the brushing of the teeth and by other mechanical influences, so that by the use of this composition permanent fillings may be inserted wherever their use is required. They will resist the otherwise extensive wearing-out action of the counter-teeth and inasmuch as they possess usually only a very slight coloration, they do not interfere with the transparency of the filling and the composition obtained thereby firmly adheres to the walls of the dental cavity and does not shrink. The use of the diamond and of carborundum or silicium-carbide is particularly advantageous in view both of the high hardness of these substances which amounts to the values 9 and 10 of the Mohs scale and in view of the freedom from coloration of the carborundum. It is of importance that the filling thereby obtains a hardness which is equal to or above the hardness of the enamel of the counter-tooth so that the filling cannot be cut by the action of this tooth.

The dental cements which are used in the composition may consist of the so-called silicate-cements or phosphate cements or mixtures thereof. Such mixtures if used alone, as for instance, mixtures of silicates of aluminium and of beryllium with phosphoric acid, although very hard, are not sufficiently adhesive and are likely to be injured in the chewing action. All these drawbacks are however overcome by the admixture of the hardening agents of this invention.

Under ordinary conditions the dental cements may be mixed with 10-30% of a finely ground powder of carborundum or of diamond powder or mixtures thereof which have been preferably previously washed and worked into a kind of slime by treatment with water.

The invention is not limited to the particular percentages of hardening and binding agents hereinbefore mentioned by way of exemplification only and it should be understood that the substances and dental cements mentioned and the manner of combination thereof are subject to modifications and changes in accordance with varying conditions of application, and without deviating from the scope of the invention as defined by the appended claim.

We claim:—

A composition material adapted to serve as a dental filling material comprising a mixture of dental cement and a finely divided material having a hardness of at least 9 in the Mohs scale and selected from the class of materials consisting of diamond, and silicon-carbide.

WERNER SALZMANN.
RUDOLF FUNKE.